C. H. Hall,

Oil Still,

No. 2,470.

Reissued Jan. 29. 1867.

Witnesses:

W. Young Jr.

Wm. Irwin

Inventor:

C. H. Hall

Per Munn & Co

Attorneys

UNITED STATES PATENT OFFICE.

C. H. HALL, OF BINGHAMTON, NEW YORK.

IMPROVED APPARATUS FOR DISTILLING PETROLEUM AND OTHER LIQUIDS.

Specification forming part of Letters Patent No. 55,855, dated June 26, 1866; Reissue No. 2,470, dated January 29, 1867.

*To all whom it may concern:*

Be it known that I, C. H. HALL, of Binghamton, in the county of Broome and State of New York, have invented a new and Improved Distilling Apparatus; and I do hereby declare that the following is a full, clear, and exact description which will enable others skilled in the art to make and use the same, reference being had to the accompanying drawings, forming part of this specification, in which—

Figure 1:
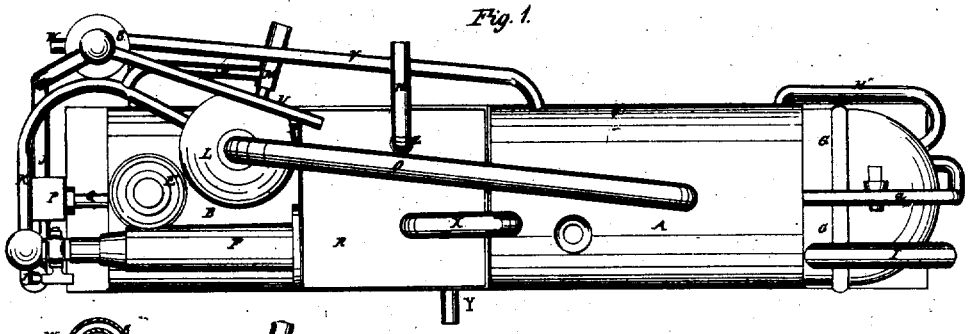
Figure 2:
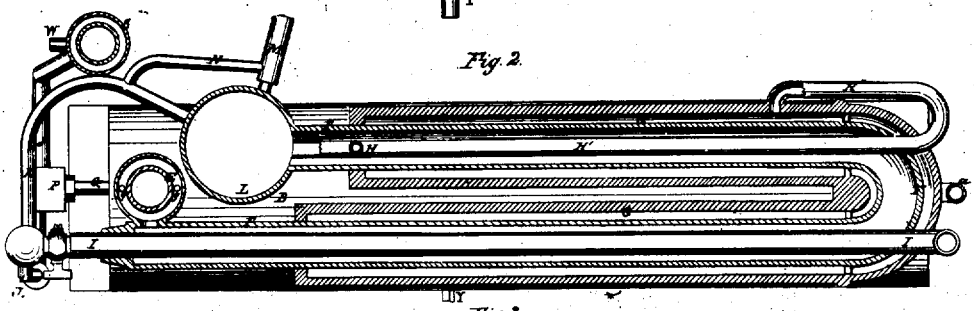
Figure 3:
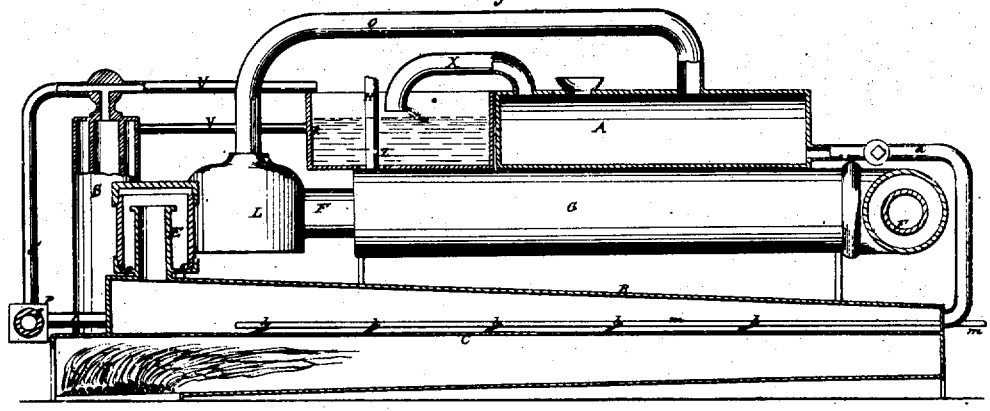

Figure 1 represents a plan or top view of this invention. Fig. 2 is a horizontal section of the same. Fig. 3 is a longitudinal vertical section of the same.

Similar letters of reference indicate like parts.

This improvement relates to an apparatus particularly designed for refining petroleum-oil, but which may be used for refining coal-oils, turpentine, or volatile liquids of any description.

It consists, first, of a supply-tank into which the crude oil or other liquid is first placed to be refined and in which it is partially heated; second, of a retort into which the oil or other liquid flows to be distilled and through which it passes in a thin stratum; third, of a chamber through which the vapors pass into the condenser; fourth, of a condenser in which the volatile portions of the oil or other liquids become condensed; fifth, of a receiver in which the products of condensation are collected and separated from the non-condensable gases; sixth, of a series of water and steam jackets inclosing the condenser in which steam is generated by the heat of the condensing vapors of the oil or other liquid being distilled; seventh, of a series of scrapers carried over the bottom of the retort to prevent the forming of a sediment on said bottom; eighth, of a purifying-tank into which the residuum is forced by jet of steam, and, lastly, of a furnace and arch over which the retort is placed.

A represents the supply-tank in which the oil or other liquid is placed to be distilled.

B represents a retort, which may be long and flat-bottomed, with a semicircular top, or which may be of any other suitable form or shape. Into this retort the oil or other liquid to be distilled flows from tank A, so as to cover the bottom in a thin stratum.

C represents the arch over which the retort B is placed in such a manner that the fire can strike no other part of said retort but the bottom.

D represents the furnace in which the fire is made.

E represents the vapor-chamber into which the vapors of the oil or other liquid being distilled pass from retort B. It consists of an outer jacket closed at the top and fastened to the top retort, B, with an inner concentric tube leading into said retort, so arranged that the vapors of oil or other liquids passing through said chambers will deposit any particles of crude liquid which may be carried up the inner tube into the bottom of the annular space between its inner tube and outer jacket, while the volatile parts of the liquid only can pass into the condenser.

F represents the U-formed horizontal tube through which the vapors pass from chamber E while being condensed.

G represents the jacket which surrounds one branch of tube E, into which water is forced through pipe *y*, producing steam from the heat of the vapors passing through said tube F.

I is a smaller tube concentric within tube F, and passing through the same, and connecting with jacket G, as is plainly shown in Fig. 1 of the drawings, so that the steam formed in jacket G in passing through the said tube I becomes superheated, and issuing from pipes K and J is fit to be used for driving an engine, or for other purposes hereinafter mentioned.

G′ is another jacket, which surrounds the other branch of condensing-tube F, into which water is conveyed through pipe H, which passes into the last-mentioned branch of tube F through connection Z, thence through said tube, and returns into jacket G′, as is plainly shown in Fig. 2 of the drawings.

R represents the water-tank into which the water rises from jacket G through connection Z.

L represents the receiver, into which the products of distillation collect from tube F, the condensable portions of which remain on the bottom, while the non-condensable products pass off through bent tube O.

Q is a pipe leading from retort B, through which the residuum passes to the T-coupling P.

J represents a steam-pipe which branches off from tube I, and, entering T-coupling P at right angles with pipe Q, creates a suction by the force of a jet of steam across the mouth of pipe Q in such a manner that the residuum from retort B is forced through pipe J′ into tank S.

K is a steam-pipe, which also branches off from tube I, and passes into receiver L, and turns upward into the mouth of tube O, so that a jet of steam issuing therefrom sweeps the non-condensable gases which collect in the upper portion of receiver I through said tube O.

M represents the spout through which the refined oil or other liquid is discharged from receiver L.

N is a pipe which branches off from steam-pipe K, and leads a jet of steam into spout M, to facilitate the discharge of the refined oil from receiver L.

*a* is a bent pipe, into which is inserted a valve through which the crude oil or other liquid is let down into retort B.

S represents the tank into which the residuum is forced. Said tank is provided with a concentric tube, S′, reaching nearly to its bottom, through which the residuum, together with the water which passes through pipe U from water-tank R, are forced to pass before they are allowed to separate. The water and dregs then pass out through pipe W, while the purified residuum rises to the top of the annular chamber between tube S′ and the outer jacket of tank S.

*g g* are two small tubes leading from the annular space in chamber E in retort B, which provides for the return of the crude liquids, which may fall into said annular space back into retort B again.

V is the pipe which leads the purified residuum back into supply-tank A to be redistilled.

*h h h* represent a series of scrapers placed at suitable intervals and attached to a common rod, *m*, which passes through the end or head of retort B. A suitable motion is imparted to rod *m* by hand or other power, which causes scrapers *h h h* to traverse the surface of the bottom of retort B, thus preventing the formation of a sediment on said bottom. The process of refining petroleum-oil or other liquids in my apparatus is as follows: The crude oil or other liquid to be refined is first placed in supply-tank A, from which it is allowed to flow slowly through pipe *a* down into retort B, and covers the bottom of said retort in a thin stratum, so that the vapors, as they are generated in the said bottom, may pass freely to the surface instead of being held in contact with the heat by a supernatant stratum of oil, until destructive distillation of the liquid ensues, as is generally the case when the hydrogen of the oil or other liquid within the still separates from the carbon and leaves the same as a black cake in the residuum; and to further provide against the destructive distillation of the vapors no part of the retort B is exposed to the action of the fire except its bottom, thereby removing the principal cause of the deposit of coloring-matter in the distillate, which takes place when the charge in a still gets low. The vapors coming in contact with the overheated surface above the liquid at such times causes said vapors to separate into their constituent elements, one of which is hydrogen gas, which in its impure state imparts to the distillate a disagreeable odor, while the particles of carbon thus liberated pass off with the vapors, and, condensing in the distillate, serve to color the same. A series of scrapers, *b b b*, attached to a common rod, *m*, is provided, and is moved by hand or other power upon the bottom of retort B, so that the sediment cannot become burned upon said bottom. The retort is placed over the arch C and furnace D in such a manner that when the fire is made in said furnace the heat passes along the arch, striking the bottom of the retort with diminishing intensity, while the crude oil enters the end of the retort farthest from the fire and flows toward the furnace. By this arrangement the crude oil or other liquid to be distilled becomes gradually heated and volatile, and if it is properly applied to the retort, and in due proportion to the heat supplied by furnace D, the volatile parts of said oil or liquid, of the various gravities of which it is composed, as they are vaporized by the increasing intensity of the heat while flowing toward said furnace, become commingled while in the vaporous state in the upper portion of retort B and pass through chamber E into condenser F, while the residuum only passes through pipe Q.

The particles of crude oil or other liquid being distilled which generally pass over with the vapors, thereby coloring the distillate, are in my apparatus deposited in the annular space contained in chamber E and fall back into the retort through pipes *g g*, while nothing but pure vapor can pass into the condenser. The vapors of the oil or other liquid being distilled pass from chamber E into tube F, in which, as it is inclosed in water-jackets G and G′, the condensation of said vapors takes place. The liquid portion falling into the lower part of the tube and passing into receiver L is discharged from spout M, while its gaseous constituents remain in the upper portion of said tube, and, passing into receiver L, are discharged through pipe O. By this arrangement the distillate, thus entirely freed from contact with such non-condensable gases as are generated in the retort, cannot absorb any of them, consequently (in the case of petroleum) emits no unpleasant odor, and is non-explosive in any ordinary temperature, while by the ordinary process of condensation, the vapors being forced to pass downward through a coiled pipe placed within a tank of water, the non-condensable gases become mechanically mixed with the distillate, rendering the same explosive and of a disagreeable odor, and to obviate which a subsequent treatment with acids, alkalies, and water is resorted to, which but imperfectly accomplishes the object sought. Steam is generated in jacket G, which, passing through tube I, becomes superheated by the vapors issuing from chamber E, and is then applied to various useful purposes. By this arrangement the heat which is ordinarily wasted is economized, and the necessity of constructing an independent steam-generating apparatus is obviated. Cold water being circulated freely through pipe H into jacket G′, thence through connection Z into water-tank R, the point at which the condensation of the vapor passing through this branch of tube F begins can be easily regulated by the amount of water permitted to enter pipe H, so that any desired percentage of the most volatile portion of the distillate will pass off in the vaporous state and leave the distillate of any specific gravity. The residuum as it accumulates in the front part of retort B passes through pipe Q, and is then forced by a jet of steam issuing from steam-pipe J into tank S, where it is purified by being forced, together with a stream of water, from pipe U through a tube, S′, which, being situated within tank S and open at its lower end, permits a separation of the water and dregs from the oily matter, the former passing out through pipe W, and the latter rising above the water in the annular space, from which it may flow back into the supply-tank to mingle with the crude liquid again. By this arrangement all other residuum may be removed from the retort as fast as it accumulates without any danger from explosion in consequence of exposing the same while hot to the atmosphere. It is also simultaneously freed from its earthy impurities without additional expense. The current of steam which passes through pipe K is injected into the mouth of pipe O from within receiver L, which carries with it the non-condensable gases and light vapors, which do not condense into tank A. This current of steam also serves to partially heat the oil or other liquid in tank A previous to its passing into the retort. The non-condensable gases finally escape through pipe Z. Thus by my apparatus may a continuous distillation of oil or other liquids be effected with safety and rapidity with the least possible expenditure of fuel and waste of useful products, and in a manner obviating the necessity of a subsequent chemical treatment of the product.

What I claim as new, and desire to secure by Letters Patent, is—

1. In the continuous distillation of petroleum or other liquids, the use of a retort, B, in combination with furnace D and arch C, substantially as shown and described, and for the purpose set forth.

2. Passing the liquids to be distilled through the retort in the form of a thin stratum, substantially as and for the purpose described.

3. The device herein described for generating steam, consisting of the water-jacket G and water-supply pipe *y* and steam-tube I, in combination with condensing-tube F, substantially as shown and described, or any other means whereby steam is generated by passing the vapors of oil or other liquids being distilled through a vessel containing water, or vice versa.

4. The method herein described of separating the condensable vapors from the non-condensable gases, or any other method whereby the condensable vapors are made to collect in the lower part of a receiver, while the non-condensable gases are made to pass off by the suction of a current of steam, substantially as herein set forth, and for the purpose specified.

5. The water-jacket G′, connected with supply-pipe H and water-tank R, in combination with tubular condenser E, operating as described, or in any other manner to accomplish the purpose specified.

6. The receiver L, in combination with tubular condenser F, steam-pipe K, and discharge-pipe O, operating substantially as and for the purpose shown and described.

7. The annular chamber E, composed by an inner and outer vessel, in combination with the condenser F, constructed and operating substantially as and for the purpose specified.

8. The method herein described of freeing the retort B from residuum, or any other equivalent means whereby a retort or still is freed of its residuum by the force of a jet of steam operating substantially as shown and described.

9. The within-described process of cleaning the residuum by treating it with steam and water, substantially in the manner described, and for the purpose set forth.

The above specification of my reissue signed by me this 13th day of July, 1866.

C. H. HALL.

Witnesses:
WM. T. MCNAMARA,
ALEX. F. ROBERTS.